(12) United States Patent
Baltaxe et al.

(10) Patent No.: US 12,306,355 B2
(45) Date of Patent: May 20, 2025

(54) OBJECT HEIGHT ESTIMATION USING ULTRASONIC SENSORS

(71) Applicant: GM GLOBAL TECHNOLOGY OPERATIONS LLC, Detroit, MI (US)

(72) Inventors: Michael Baltaxe, Kfar Saba (IL); Michael Slutsky, Kefar-Saba (IL); Ariel Rubanenko, Hod Hasharon (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 18/190,437

(22) Filed: Mar. 27, 2023

(65) Prior Publication Data
US 2024/0329225 A1   Oct. 3, 2024

(51) Int. Cl.
*G01S 7/539* (2006.01)
*G01S 15/89* (2006.01)
*G01S 15/931* (2020.01)

(52) U.S. Cl.
CPC .............. *G01S 7/539* (2013.01); *G01S 15/89* (2013.01); *G01S 2015/938* (2013.01)

(58) Field of Classification Search
CPC ........ G01S 15/89; G01S 7/539; G01S 15/931; G01S 2015/938; F04B 7/00; F04B 45/047; F04B 43/046; F04B 13/00; F04B 39/08; F04B 53/10
See application file for complete search history.

(56) References Cited

U.S. PATENT DOCUMENTS

| | | | |
|---|---|---|---|
| 2014/0016004 A1* | 1/2014 | Talvala | H04N 25/60 348/E5.079 |
| 2017/0278326 A1* | 9/2017 | DeCia | G01S 5/02585 |
| 2018/0204097 A1* | 7/2018 | Karki | G06T 5/50 |
| 2018/0232947 A1* | 8/2018 | Nehmadi | G01S 7/295 |
| 2018/0365506 A1 | 12/2018 | Clifford | |
| 2019/0258737 A1 | 8/2019 | Wang | |
| 2020/0103518 A1* | 4/2020 | Schulz | G01S 13/865 |
| 2022/0277472 A1* | 9/2022 | Birchfield | G06N 3/08 |

* cited by examiner

*Primary Examiner* — Daniel L Murphy
*Assistant Examiner* — Amie M Ndure
(74) *Attorney, Agent, or Firm* — Quinn IP Law (57) ABSTRACT

A disclosure is presented for estimating height of an object using ultrasonic sensors carried onboard a vehicle. The height may be estimated by generating ultrasonic distance measurements based on a time of flight associated with ultrasonic reflections detected with the ultrasonic sensors, generating a three-dimensional (3D) occupancy grid to volumetrically represent at least a portion of an environment within field of view of the ultrasonic sensors, the 3D occupancy grid including a plurality of volumetric pixels (voxels), assigning a count value to each of the voxels based on the distance measurements, and estimating the height according to a relative spatial relationship between the vehicle and the voxel having the count value with a greatest value.

20 Claims, 4 Drawing Sheets

OBJECT HEIGHT ESTIMATION USING ULTRASONIC SENSORS

INTRODUCTION

The present disclosure relates to generating object height estimations using ultrasonic sensors, such as but not necessarily limited to including ultrasonic sensors onboard a vehicle to estimate height of approaching objects.

A vehicle may employ an object detection system to assist in detecting and navigating relative to approaching objects. In the case of vehicles used for ground transportation, such as but not necessarily limited to automobiles, it may be desirable to utilize ultrasonic sensors as part of the object detection system. The inclusion of ultrasonic sensors within detection systems may be beneficial when performing certain tasks, such as when parking or slowly navigating relative to stationary objects where longer range prediction and precise directionality may be less influential or necessary.

SUMMARY

One non-limiting aspect of the present disclosure relates to a system for object height estimation using ultrasonic sensors. The system may include a vehicle and a plurality of ultrasonic sensors onboard the vehicle. The ultrasonic sensors may include a transmitter configured for emitting ultrasonic sound waves outwardly into an environment of the vehicle and a receiver configured for receiving ultrasonic reflections from an object within the environment reflecting the sound waves. The system may further include a height estimation module onboard the vehicle configured for generating ultrasonic distance measurements based on a time of flight of the ultrasonic reflections, generating a three-dimensional (3D) occupancy grid to volumetrically represent at least a portion of the environment, assigning a count value to each of the voxels based on the distance measurements, and estimating a height of the object according to a relative spatial relationship between the vehicle and a voxel having the count value with a greatest value. The distance measurements may represent a relative distance between the object and the receiver receiving the corresponding ultrasonic reflection. The 3D occupancy grid may include a plurality of volumetric pixels (voxels) to define equal units of volumetric space. The count values may represent a probabilistic prediction of the object being present within the volumetric space of the corresponding voxel.

The height estimation module may be configured for estimating the height based on generating the distance measurements on an interval-by-interval basis for a plurality of intervals. The intervals may occur while the vehicle is in motion toward the object, each successive interval corresponding with the vehicle moving closer to the object.

The height estimation module may be configured for incrementing on the interval-by-interval basis the count value assigned to each voxel spatially overlapping with one of the distance measurements.

The height estimation module may be configured for decrementing on the interval-by-interval basis the count value assigned to each voxel spatially non-overlapping with one of the distance measurements.

The height estimation module may be configured for incrementing the voxels by a constant value.

The height estimation module may be configured for decrementing the voxels by a proportional value.

The proportional value may be represented as:

$$P = f\left(D - \sqrt{(x-x_v)^2 + (y-y_v)^2(z-z_v)^2}\right)$$

where P is the proportional value, D corresponds with one of the distance measurements, x, y, z correspond with the location of the vehicle, $x_v$, $y_v$, $z_v$ correspond with the location of the corresponding voxel relative to the location of the vehicle and $f$ is a monotonically increasing function when $D > \sqrt{(x-x_v)^2 + (y-y_v)^2(z-z_v)^2}$.

The height estimation module may be configured for determining the distance measurements as overlapping with the voxels having a portion thereof within a predefined spatial relationship to the corresponding distance measurement.

The predefined spatial relationship may be represented as:

$$D - \varepsilon < \sqrt{(x-x_v)^2 + (y-y_v)^2(z-z_v)^2} < D + \varepsilon$$

where D corresponds with one of the distance measurements, ε corresponds with a constant approximately equal to the volumetric space of each voxel, x, y, z correspond with a location of the vehicle, and $x_v$, $y_v$, $z_v$ correspond with a location of the corresponding voxel.

The distance measurements may correspond with a spherical distance from the corresponding receiver.

The distance measurements may be incapable of representing a direction to the object with more specificity than a field of view of the corresponding receiver.

One non-limiting aspect of the present disclosure relates to a method for object height estimation using ultrasonic sensors onboard a vehicle. The method may include generating ultrasonic distance measurements based on a time of flight associated with ultrasonic reflections detected with the ultrasonic sensors, generating a three-dimensional (3D) occupancy grid to volumetrically represent at least a portion of an environment within a field of view of the ultrasonic sensors, assigning a count value to each of a plurality of voxels based on the distance measurements, and estimating a height of the object according to a relative spatial relationship between the vehicle and the voxel having the count value with a greatest value.

The method may include generating the distance measurements on an interval-by-interval basis for a plurality of intervals and incrementing on the interval-by-interval basis the count value assigned to each voxel spatially overlapping with one of the distance measurements.

The method may include decrementing on the interval-by-interval basis the count value assigned to each voxel spatially non-overlapping with one of the distance measurements.

The method may include incrementing the voxels by a constant value and decrementing the voxels by a proportional value.

The method may include determining the distance measurements as overlapping with the voxels having a portion thereof within a predefined spatial relationship to the corresponding distance measurement.

The method may include representing the predefined spatial relationship as:

$$D - \varepsilon < \sqrt{(x-x_v)^2 + (y-y_v)^2(z-z_v)^2} < D + \varepsilon$$

where D corresponds with one of the distance measurements, ε corresponds with a constant approximately equal to the volumetric space of each voxel, x, y, z correspond with a location of the vehicle, and $x_v$, $y_v$, $z_v$ correspond with a location of the corresponding voxel.

One non-limiting aspect of the present disclosure relates to a module configured for operating onboard a vehicle to estimate a height of an object height based on ultrasonic reflections detected with ultrasonic sensors onboard the vehicle. The module may be operable for tracking the ultrasonic reflections on an interval-by-interval basis for a plurality of intervals, generating on an interval-by-interval basis ultrasonic distance measurements based on a time of flight of the ultrasonic reflections generating a three-dimensional (3D) occupancy grid to volumetrically represent an environment external to the vehicle, assigning on the interval-by-interval basis a count value to each of the voxels based on the distance measurements, and estimating a height of the object at a conclusion of the intervals according to a relative spatial relationship between the vehicle and the voxel having the count value with a greatest value.

The module may be operable for incrementing on the interval-by-interval basis the count value assigned to each voxel spatially overlapping with one of the distance measurements and decrementing on the interval-by-interval basis the count value assigned to each voxel spatially non-overlapping with one of the distance measurements.

The module may be further operable for determining the distance measurements as overlapping with the voxels having a portion thereof within a predefined spatial relationship to the corresponding distance measurement, the predefined spatial relationship as:

$$D - \varepsilon < \sqrt{(x - x_v)^2 + (y - y_v)^2(z - z_v)^2} < D + \varepsilon$$

where D corresponds with one of the distance measurements, ε corresponds with a constant approximately equal to the volumetric space of each voxel, x, y, z correspond with a location of the vehicle, and $x_v$, $y_v$, $z_v$ correspond with a location of the corresponding voxel.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
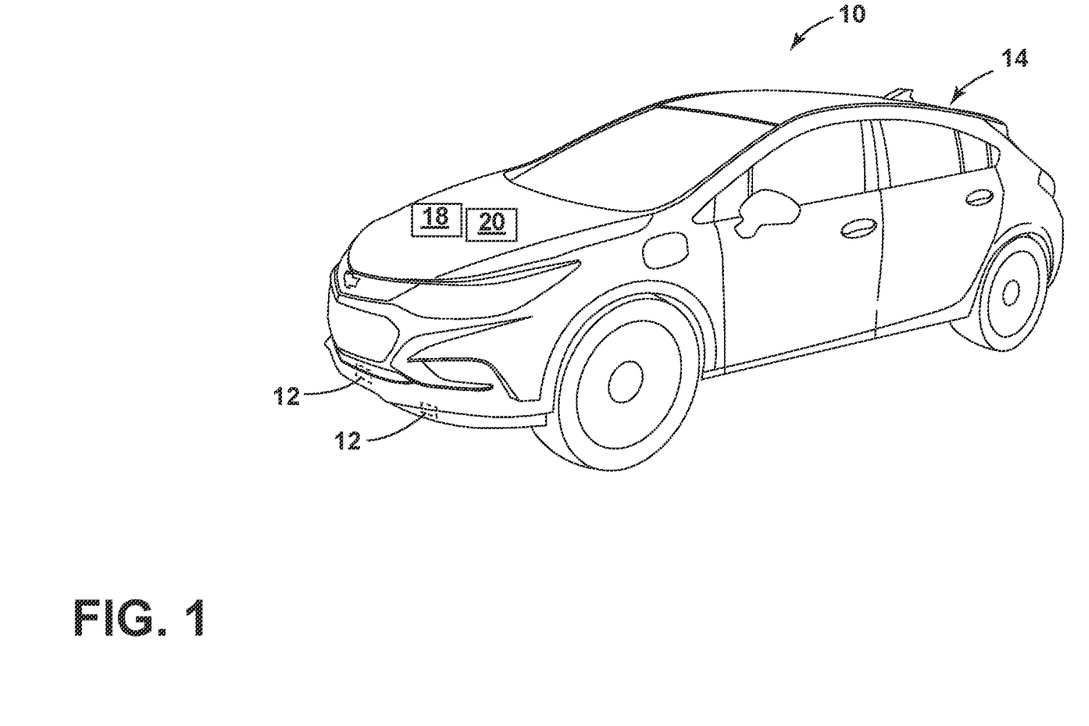
FIG. 1 illustrates a system for object height estimation using ultrasonic sensors in accordance with one non-limiting aspect of the present disclosure.
Figure 2:
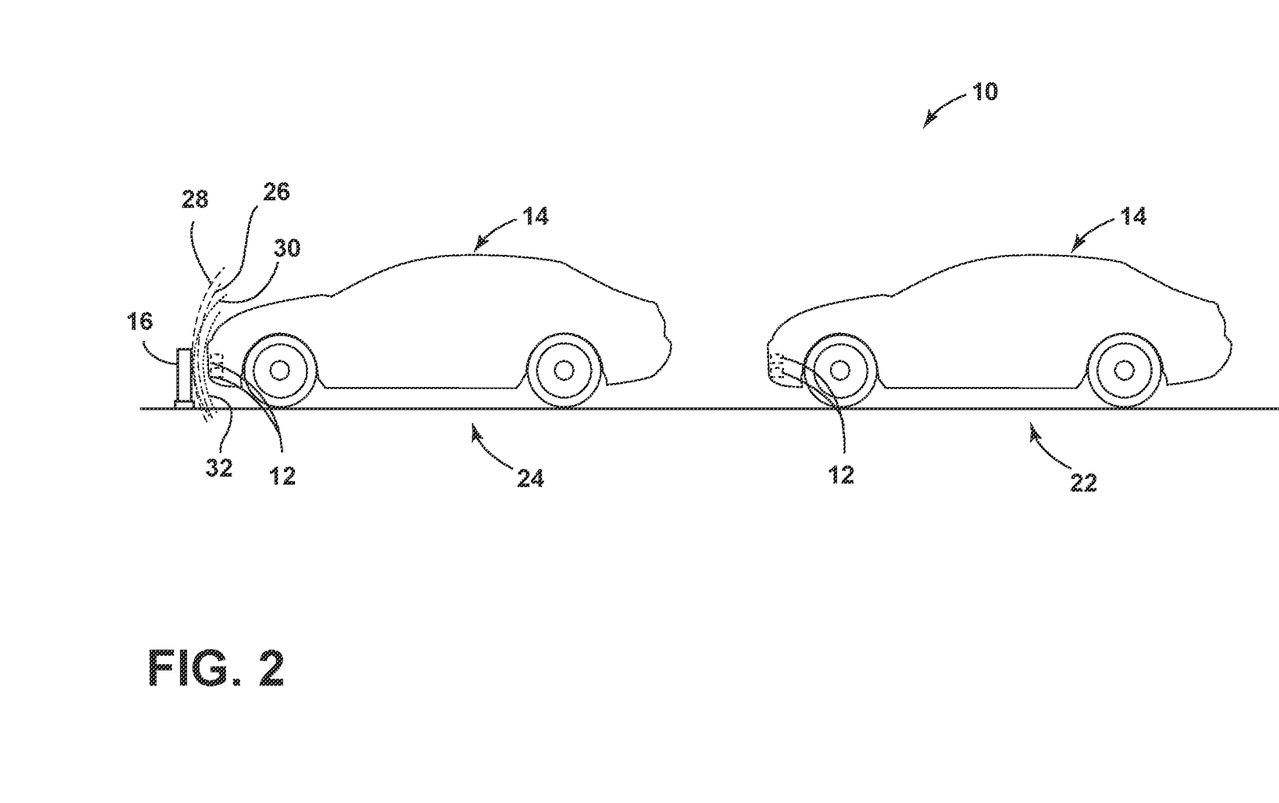
FIG. 2 illustrates the system using ultrasonic sensors in accordance with one non-limiting aspect of the present disclosure.

FIG. 1 illustrates a system 10 for object height estimation using ultrasonic a plurality of sensors 12 in accordance with one non-limiting aspect of the present disclosure. FIG. 2 illustrates the system 10 as described for exemplary purposes with respect to sensors 12 be ultrasonic sensors included onboard a vehicle 14 to detect approaching objects 16, which may be stationary and/or moving. For the sake of presentation simplicity, a single, stationary object 16 is illustrated for non-limiting purposes. The vehicle 14 is illustrated as a ground vehicle 14, such as an automobile, however, the present disclosure fully contemplates its use and application with other types of devices. The ultrasonic sensors 12 may be included as part of an object detection system 18 operating onboard the vehicle 14. The object detection system 18 may be configured in the manner described herein for estimating a height of the object approaching or otherwise in a vicinity of the vehicle 14 based on measurements made with the ultrasonic sensors 12. The height estimates may thereafter be utilized with other systems onboard and/or offboard the vehicle 14, such as to provide object height estimates to navigation, driver assistance, autonomous or semi-autonomous, and other such controllers and modules.

The object height estimates described herein may be employed for various purposes and activities associated with a wide variety of vehicle 14 operations. One non-limiting aspect of the present disclosure contemplates the object height estimates being particularly beneficial for use when the object detection system 18 includes capabilities for detecting objects 16 within a relatively short range to the vehicle 14 and/or while the vehicle 14 is engaging in lower-speed operations, such as while the vehicle 14 is parking or attempting to slowly navigate around relative nearby objects 16. The use of the ultrasonic sensors 12 to generate such object height estimations may be particularly beneficial due to the ultrasonic sensors 12 generally having a lower cost and a shorter operating range than more robust or sophisticated sensors, such as sensors typically required when supporting radar, Lidar, and/or video based object detections. The ultrasonic sensors 12 may be configured with a transmitter for emitting ultrasonic sound waves or pulses and a receiver for receiving ultrasonic reflections from the object reflecting the sound waves.

The ultrasonic sensors 12 are shown for non-limiting purposes as including a pair of sensors 12 affixed to a front bumper of the vehicle 14 to facilitate detecting for the objects 16 in front of the vehicle 14. The present disclosure, however, fully contemplates the use of more sensors 12, including additional sensors 12 positioned on a rear bumper or elsewhere on the vehicle 14 to facilitate object detections relative thereto. The object detection system 18 may be operable with a height estimation module 20 configured for generating an ultrasonic distance or range measurement to represent a relative distance of the object based on a time-of-flight (TOF) associated with an ultrasonic reflection therefrom. The height estimation module 20 may be configured for generating a plurality of ultrasonic distance measurement across a plurality of temporally spaced intervals, and thereafter, for generating the object height estimations based on a tabulation of the ultrasonic distance measurements made across each interval. While the present disclosure fully contemplates generating object height estimations based on a single interval or single sequence of measurements, the tabulation of the plurality of ultrasonic distance measurement across a plurality of intervals may be beneficial in maximizing precision.

FIG. 1 illustrates the vehicle 14 when at a first location 22 and at a second location 24 relative to the object 16. The first location 22 may correspond with a first interval of the plurality of intervals used for generating an object height estimation for the object 16. The second location 24 may correspond with a last interval of a successive sequence of intervals comprising the plurality of intervals used for generating the object height estimation. The quantity of intervals and the duration between each interval may vary according to design parameters and/or operating capabilities of the ultrasonic sensors 12. The ultrasonic distance measurements generated during the first interval and the last interval are illustrated to correspond with a spherical distance measured relative to a surface of the object 16 generating the ultrasonic reflection and the ultrasonic sensor 12 in receipt of the corresponding ultrasonic reflection. The distance may be measured based on a TOF of the ultrasonic reflection to travel from the object to the corresponding sensor 12. For the sake of presentation simplicity, first and second spherical distances 26, 28 may be used to represent first and second ultrasonic distance measurements generated at the first location 22, and the third and fourth spherical distances 30, 32 may be used to represent third and fourth ultrasonic distance measurements generated at the second location 24.

The spherical distances 26, 28, 30, 32 are shown in a non-limiting, representational manner to correspond with a two-dimensional (2D) arcs having a radius centered relative to a center of the corresponding ultrasonic sensor 12. While illustrated two-dimensionally for illustrative purposes, the ultrasonic sensors 12 may be configured for measuring the reflections in three-dimensional (3D) space, i.e., as a segment of sphere centered at and defined by field of-view (FOV) of the ultrasonic sensor 12 associated therewith. Within a FOV of the ultrasonic sensors 12 associated therewith, the ultrasonic distance measurements may be effectively directionless in so far as lacking directionality sufficient to identify a direction or an angle to the object 16 with more specificity than the object 16 being within the FOV at some relative distance. In other words, the ultrasonic distance measurements may lack directional or orientational specificity to identify a location or an angle of the reflecting object 16 relative to the sensor 12 beyond the object 16 being within the spherical distance of the ultrasonic sensor 12. Ultrasonic sensors 12 may be vertically and/or horizontally offset from each other in the illustrated manner to provide differing perspectives, which may be beneficial in enhancing precision of the object height estimates contemplated herein.

The height estimation module 20 may be included to generate the object height estimates. One non-limiting aspect of the present disclosure contemplates the height estimation module 20 being included as part of or operable to cooperate with the object detection system 18. The object height estimates generated with the height estimation module 20, for example, may be useful in this manner to facilitate the object detection system 18 generating alerts, controlling the vehicle 14, or taking other action based on height estimates generated by the height estimation module 20 for the object 16. In the illustrated configuration, the distance measurements generated with the ultrasonic sensors 12 may be utilized by the height estimation module 20 to estimate a height for the object 16. The object detection system 18 may then utilize the height estimate to determine whether the object 16 has a height likely to disrupt or otherwise influence operation of the vehicle 14, e.g., to determine whether the height of the object 16 would cause the object 16 to contact the front bumper or another portion of the vehicle 14.

Figure 3:
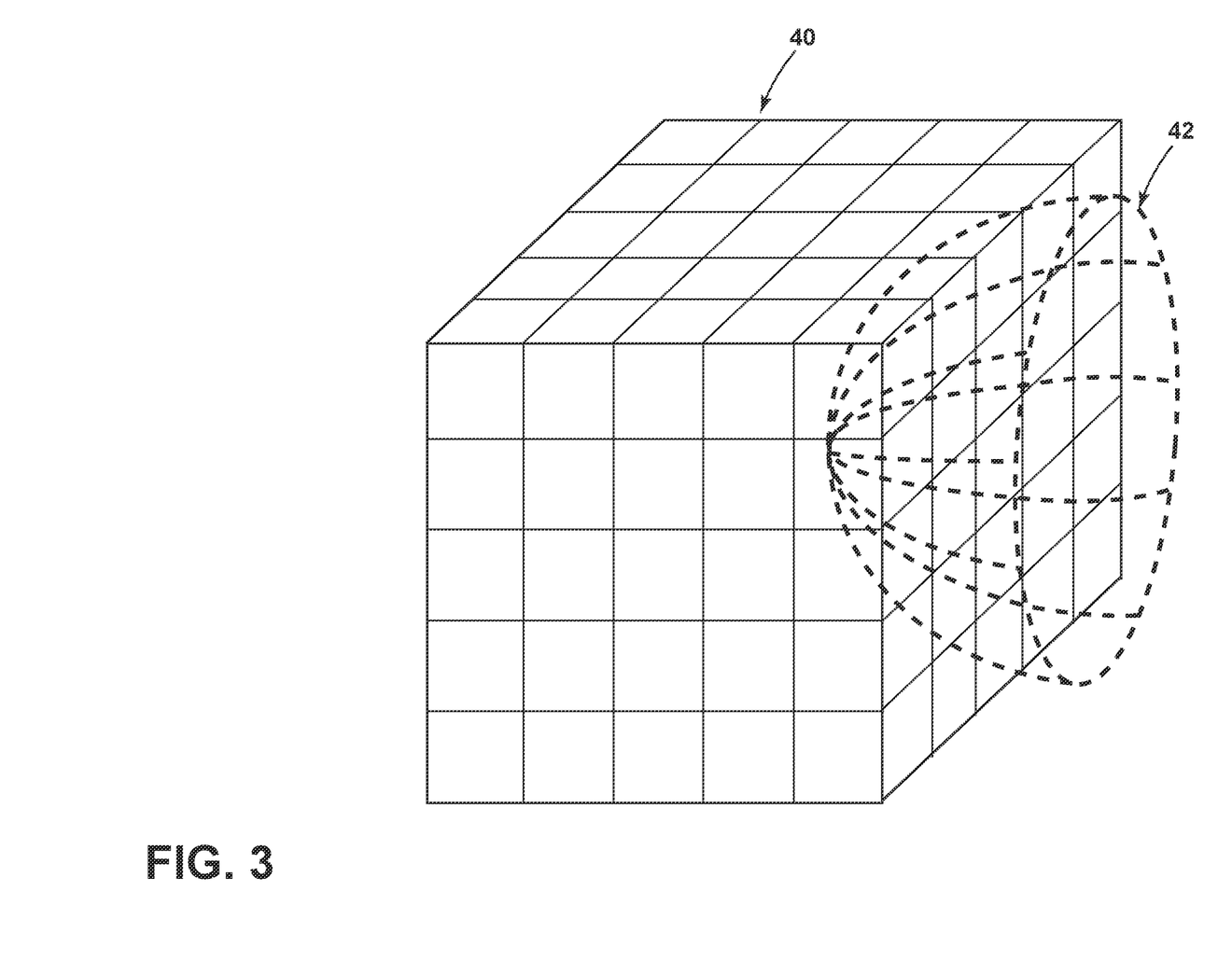
FIG. 3 illustrates an occupancy grid in accordance with one non-limiting aspect of the present disclosure.

FIG. 3 illustrates an occupancy grid 40 in accordance with one non-limiting aspect of the present disclosure. The height estimation module 20 may be configured to generate the occupational grid as a 3D volumetric representation of an environment of the vehicle 14 within the FOV of the ultrasonic sensors 12. The 3D occupancy grid 40 may include a plurality of volumetric pixel (voxels) to define units of volumetric space. The voxels are illustrated as squares and may be considered as 3D pixels used to individually represent a portion of the volumetric space within the FOV of the ultrasonic sensors 12. The voxels are shown for non-limiting purposes as providing equal units of measure, i.e., being the same size, as the present disclosure fully contemplates volumetrically partitioning the occupancy grid 40 according to differing volumetric shapes and sizes of the same or differing dimension. The height estimation module 20 may be configured to assign a count value to each of the voxels depending on whether the voxel coincides with one of the distance measurements. The distance measurements may be determined to coincide with one of the voxels when the spherical distance associated therewith traverses, crosses, contacts, intersects, or is otherwise overlapping with one of the voxels.

An exemplary spherical distance 42 is shown in FIG. 3. The spherical distance may correspond with one of the above-described first, second, third or fourth spherical distances 26, 28, 30, 32. The spherical distance 42 is shown in 3D to correspond with a spherical segment or surface of a sphere centered at the corresponding ultrasonic sensor 12 and shaped to correspond with the FOV of the ultrasonic sensor 12. The exemplary spherical distance 42 is shown for non-limiting purposes to correspond with an approximately 180 degree FOV, as the ultrasonic sensors 12 may have differing FOVs, optionally with the FOVs having non-circular shapes. One non-limiting aspect of the present disclosure contemplates selecting the FOV of the ultrasonic sensors 12 depending on the environment of the vehicle 14 desired for monitoring, e.g., smaller FOVs or differently shaped FOVs may be selected depending on the size and shape of the environment to be monitored. In the above-described example where the ultrasonic sensors 12 may be included for parking assist to determine whether approaching objects 16 are likely to contact the front bumper, the FOVs may be sized and shaped to monitor from the ground up to an area above the front bumper.

The occupancy grid 40 may include a zero or null value for each of the voxels prior to the above-described first interval, e.g., before one of the ultrasonic sensors 12 detects one of the ultrasonic reflection from the object 16. For the first interval and each successive interval thereafter, the count value assigned to each voxel may be maintained, incremented, or decremented on an interval-by-interval basis depending on the distance measurements associated therewith. In other words, the distance measurements for each of the ultrasonic sensor 12 may be taken for each interval and overlaid relative to the occupancy grid 40 to determine whether one or more of the voxels overlapping therewith, with the count values be similarly assigned. The occupancy grid 40 may represent a relative volumetric space exterior to the ultrasonic sensors 12 such that the distance measurements taken during different intervals, e.g., as the vehicle 14 approaches the object 16, may be relatable when taken at differing distances relative to the object 16. A plurality of the ultrasonic distance measurement may be tabulated iteratively in this manner across each of the intervals to estimate a height of the object 16 to correspond with the voxel having the greatest count value, i.e., the voxel most traversed after tabulating the distance measurements.

The height estimation may optionally be generated on an interval-by-interval basis according to changes in the account values assigned to the voxel. The count values assigned during a prior interval may be incremented and decremented for each successive interval depending on whether one or more of the distance measurements continue overlapping therewith. One non-limiting aspect of the present disclosure contemplates determining the distance measurements to overlap with the voxels having a portion thereof within a predefined spatial relationship to the corresponding distance measurement. The predefined spatial relationship may be represented as:

$$D - \varepsilon < \sqrt{(x-x_v)^2 + (y-y_v)^2(z-z_v)^2} < D + \varepsilon$$

where D corresponds with one of the distance measurements, ε corresponds with a constant approximately equal to the volumetric space of each voxel, x, y, z correspond with a location of the vehicle 14, and $x_v$, $y_v$, $z_v$ correspond with a location of the corresponding voxel relative to the location of the vehicle 14.

One non-limiting aspect of the present disclosure contemplates incrementing the voxels within the predefined spatial relationship to the distance measurements by a constant value and decrementing the voxels outside thereof by a proportional value. The incrementing may be represented as:

$$O_t(x_v, y_v, z_v) = O_{t-1}(x_v, y_v, z_v) + T$$

where $O_t(x_v, y_v, z_v)$ corresponds with the count value currently assigned to one of the voxels, $O_{t-1}(x_v, y_v, z_v)$ corresponds with the count value previously assigned to the same voxel, and T is the constant value. The constant value T, for example, may be 1. The decrementing may be represented as:

$$O_t(x_v, y_v, z_v) = O_{t-1}(x_v, y_v, z_v) - P$$

where $O_t(x_v, y_v, z_v)$ corresponds with the count value currently assigned to one of the voxels, $O_{t-1}(x_v, y_v, z_v)$ corresponds with the count value previously assigned to the same voxel, and P is the proportional value. The proportional value may be represented as:

$$P = f\left(D - \sqrt{(x-x_v)^2 + (y-y_v)^2(z-z_v)^2}\right)$$

where P is the proportional value, D corresponds with one of the distance measurements, x, y, z correspond with the location of the vehicle 14, $x_v$, $y_v$, $z_v$ correspond with the location of the corresponding voxel relative to the location of the vehicle 14 and $f$ is a monotonically increasing function. The decrementing may be applied on voxels closer to the vehicle than the distance D, such as when:

$$D > \sqrt{(x-x_v)^2 + (y-y_v)^2(z-z_v)^2}.$$

Additional filtering of the count values may be performed by maintaining a list of the distance measurements with timestamps for the measurement thereof and reducing the count value as a function of time passed, such as monotonically so that older measurements have a large decrease in certainty. Further filtering may employ an uncertainty model as a function of volumetric space whereby differing probabilities may be defined depending on operating characteristics of the ultrasonic sensors 12, e.g., count values within some portions of the FOV of the ultrasonic sensors 12 may be assigned greater probability than others, such as by assigning higher probabilities to count values drive from a more central portion of the FOV than the more outside portions.

Figure 4:
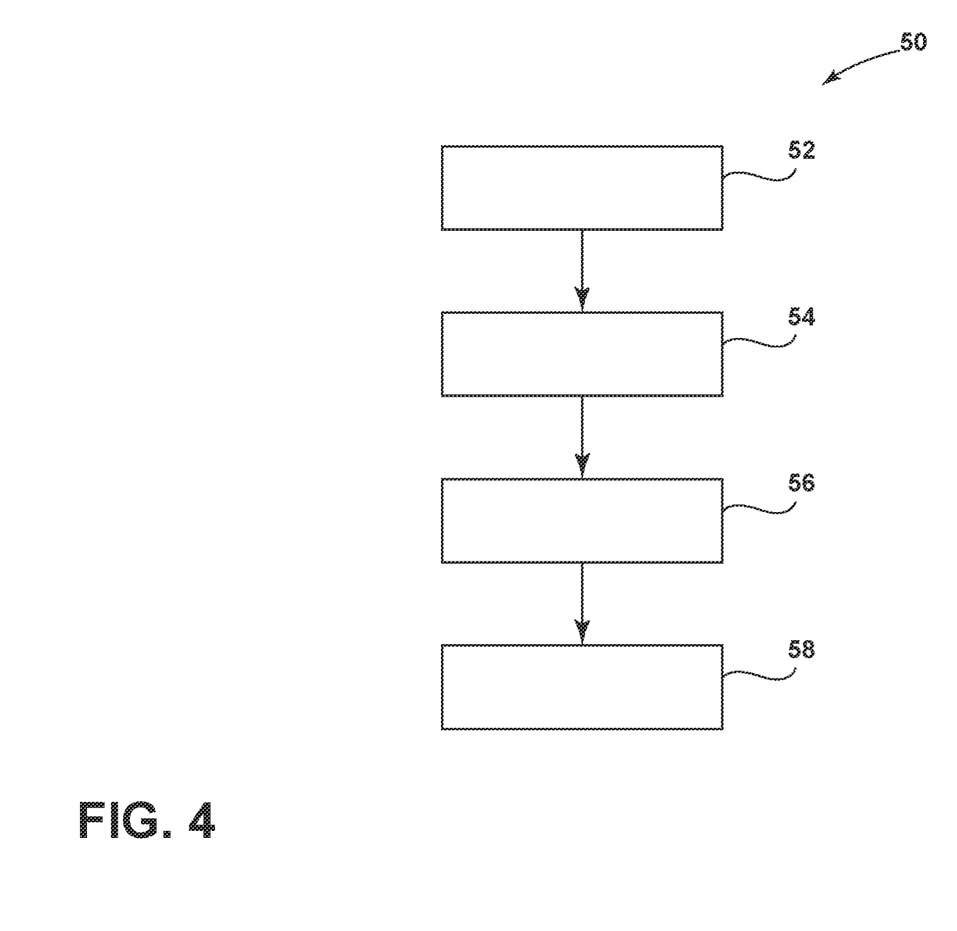
FIG. 4 illustrates a flowchart of method for object height estimation using ultrasonic sensors in accordance with one non-limiting aspect of the present disclosure.

FIG. 4 illustrates a flowchart 50 of method for object height estimation using ultrasonic sensors 12 in accordance with one non-limiting aspect of the present disclosure. The ultrasonic sensors 12, the height estimation module 20, the object detection system 18, and/or other elements described herein configured for performing the method. Each may operate according to a processor executing a plurality of non-transitory instructions stored on a computer-readable storage medium. Block 52 relates to a measurement process for generating ultrasonic distance measurements based on a TOF associated with the ultrasonic reflections reflected from the object(s). The ultrasonic reflections may be generated in response to ultrasonic sound waves emitted from ultrasonic sensors 12. As noted, the ultrasonic sensors 12 may be beneficial for the detection processes contemplated herein, however, the present disclosure fully contemplates using other sound and/or non-sound based detection methodologies, including those that may generate distance measurements using other metrics in addition to or in place of TOF. The distance measurements may be generated for each object 16 within a vicinity of the ultrasonic sensors 12 capable of generating the reflection such that the distance measurements may correspond with measurements to different objects 16.

Block 54 relates to an occupancy process for generating the 3D occupancy grid 40 to volumetrically represent the environment within the FOV of ultrasonic sensors 12. The 3D occupancy grid 40 may include a plurality of voxels for representing units of volumetric space. Block 56 relates to a count process for signing a count value to each of the voxels based on the distance measurements. The measurement process may include generating the distance measurements across a plurality of intervals, such as in response to detecting an initial ultrasonic reflection and thereafter on an interval-by-interval basis as the vehicle 14 approaches the object(s). The count process may optionally populate the voxels with a zero value or a null and thereafter incrementing or decrementing the count value assigned to each voxel on the interval-by-interval basis depending on whether one or more of the distance measurements of the corresponding interval overlap therewith. Block 58 relates to an estimation process for estimating a height of the object(s) according to a relative spatial relationship between the vehicle 14 and/or the ultrasonic sensors 12 and the associated voxel having the greatest value. In the case of multiple objects 16 causing the ultrasonic reflections, each object may be associated with a related grouping of the voxels, with the height estimation for each object being determined according to the voxel within the related group having the greatest count value. In the case of a singular object or in the case of desiring to detect the tallest object, the height estimation may correspond with the voxel having the greatest count value.

As supported above, one non-limiting aspect of the present disclosure relates to a method to estimate the height of an object by generating a 3D occupancy grid from a sequence of ultrasonic range measurements aggregated over time and vehicle kinematics information. The method may find locations with high probability of having objects (as regions with high count of consistent range measurements) and may select the height with the highest likelihood of occupancy. The ultrasonic sensors and vehicle kinematics may be used to estimate the height of objects in the environment, optionally with use of the vehicle kinematics to keep the position of the vehicle in space through time, use of the ultrasonic sensor range readings to update an occupancy grid that holds probability of space being occupied, and integrating multiple range readings from multiple ultrasonic sensors throughout the time to estimate with high probability the occupancy grid.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for object height estimation using ultrasonic sensors, comprising:
   a vehicle;
   a plurality of ultrasonic sensors onboard the vehicle, the ultrasonic sensors including:
      a transmitter configured for emitting ultrasonic sound waves outwardly into an environment of the vehicle; and
      a receiver configured for receiving ultrasonic reflections from an object within the environment reflecting the sound waves;
   a height estimation module onboard the vehicle, the height estimation module configured for:
      generating ultrasonic distance measurements based on a time of flight of the ultrasonic reflections, the distance measurements representing a relative distance between the object and the receiver receiving the corresponding ultrasonic reflection;
      generating a three-dimensional (3D) occupancy grid to volumetrically represent at least a portion of the environment, the 3D occupancy grid including a plurality of volumetric pixels (voxels) to define equal units of volumetric space;
      assigning a count value to each of the voxels based on the distance measurements, the count values representing a probabilistic prediction of the object being present within the volumetric space of the corresponding voxel; and
      estimating a height of the object according to a relative spatial relationship between the vehicle and the voxel having the count value with a greatest value.

2. The system according to claim 1, wherein:
   the height estimation module is configured for estimating the height based on generating the distance measurements on an interval-by-interval basis for a plurality of intervals, the intervals occurring while the vehicle is in motion toward the object, each successive interval corresponding with the vehicle moving closer to the object.

3. The system according to claim 2, wherein:
   the height estimation module is configured for incrementing on the interval-by-interval basis the count value assigned to each voxel spatially overlapping with one of the distance measurements.

4. The system according to claim 3, wherein:
the height estimation module is configured for decrementing on the interval-by-interval basis the count value assigned to each voxel spatially non-overlapping with one of the distance measurements.

5. The system according to claim 4, wherein:
the height estimation module is configured for incrementing the voxels by a constant value.

6. The system according to claim 5, wherein:
the height estimation module is configured for decrementing the voxels by a proportional value.

7. The system according to claim 6, wherein:
the proportional value is represented as:

$$P = f\left(D - \sqrt{(x-x_v)^2 + (y-y_v)^2(z-z_v)^2}\right)$$

where P is the proportional value, D corresponds with one of the distance measurements, x, y, z correspond with the location of the vehicle, $x_v$, $y_v$, $z_v$ correspond with the location of the corresponding voxel relative to the location of the vehicle and $f$ is a monotonically increasing function.

8. The system according to claim 3, wherein:
the height estimation module is configured for determining the distance measurements as overlapping with the voxels having a portion thereof within a predefined spatial relationship to the corresponding distance measurement.

9. The system according to claim 8, wherein:
the predefined spatial relationship is represented as:

$$D - \varepsilon < \sqrt{(x-x_v)^2 + (y-y_v)^2(z-z_v)^2} < D + \varepsilon$$

where D corresponds with one of the distance measurements, $\varepsilon$ corresponds with a constant approximately equal to the volumetric space of each voxel, x, y, z correspond with a location of the vehicle, and $x_v$, $y_v$, $z_v$ correspond with a location of the corresponding voxel.

10. The system according to claim 2, wherein:
the distance measurements corresponding with a spherical distance from the corresponding receiver.

11. The system according to claim 10, wherein:
the distance measurements are incapable of representing a direction to the object with more specificity than a field of view of the corresponding receiver.

12. A method for object height estimation using ultrasonic sensors onboard a vehicle, comprising:
generating ultrasonic distance measurements based on a time of flight associated with ultrasonic reflections detected with the ultrasonic sensors;
generating a three-dimensional (3D) occupancy grid to volumetrically represent at least a portion of an environment within a field of view of the ultrasonic sensors, the 3D occupancy grid including a plurality of volumetric pixels (voxels);
assigning a count value to each of the voxels based on the distance measurements; and
estimating a height of the object according to a relative spatial relationship between the vehicle and the voxel having the count value with a greatest value.

13. The method according to claim 12, further comprising:
generating the distance measurements on an interval-by-interval basis for a plurality of intervals; and
incrementing on the interval-by-interval basis the count value assigned to each voxel spatially overlapping with one of the distance measurements.

14. The method according to claim 13, further comprising:
decrementing on the interval-by-interval basis the count value assigned to each voxel spatially non-overlapping with one of the distance measurements.

15. The method according to claim 14, further comprising:
incrementing the voxels by a constant value; and
decrementing the voxels by a proportional value.

16. The method according to claim 13, further comprising:
determining the distance measurements as overlapping with the voxels having a portion thereof within a predefined spatial relationship to the corresponding distance measurement.

17. The method according to claim 16, further comprising:
representing the predefined spatial relationship as:

$$D - \varepsilon < \sqrt{(x-x_v)^2 + (y-y_v)^2(z-z_v)^2} < D + \varepsilon$$

where D corresponds with one of the distance measurements, $\varepsilon$ corresponds with a constant approximately equal to the volumetric space of each voxel, x, y, z correspond with a location of the vehicle, and $x_v$, $y_v$, $z_v$ correspond with a location of the corresponding voxel.

18. A module configured for operating onboard a vehicle to estimate a height of an object height based on ultrasonic reflections detected with ultrasonic sensors onboard the vehicle, the module operable for:
tracking the ultrasonic reflections on an interval-by-interval basis for a plurality of intervals;
generating on an interval-by-interval basis ultrasonic distance measurements based on a time of flight of the ultrasonic reflections, the distance measurements representing a relative distance between the object and one of the ultrasonic sensors;
generating a three-dimensional (3D) occupancy grid to volumetrically represent an environment external to the vehicle, the 3D occupancy grid including a plurality of volumetric pixels (voxels) to define units of volumetric space;
assigning on the interval-by-interval basis a count value to each of the voxels based on the distance measurements, the count values representing a probabilistic prediction of the object being present within the volumetric space of the corresponding voxel; and
estimating a height of the object at a conclusion of the intervals according to a relative spatial relationship between the vehicle and the voxel having the count value with a greatest value.

19. The module according to claim 18, further operable for:
incrementing on the interval-by-interval basis the count value assigned to each voxel spatially overlapping with one of the distance measurements; and decrementing on the interval-by-interval basis the count value assigned to each voxel spatially non-overlapping with one of the distance measurements.

20. The module according to claim 19, further operable for:

determining the distance measurements as overlapping with the voxels having a portion thereof within a predefined spatial relationship to the corresponding distance measurement, the predefined spatial relationship as:

$$D - \varepsilon < \sqrt{(x-x_v)^2 + (y-y_v)^2(z-z_v)^2} < D + \varepsilon$$

where D corresponds with one of the distance measurements, $\varepsilon$ corresponds with a constant approximately equal to the volumetric space of each voxel, x, y, z correspond with a location of the vehicle, and $x_v$, $y_v$, $z_v$ correspond with a location of the corresponding voxel.

* * * * *